United States Patent
Jiao et al.

(10) Patent No.: US 11,229,188 B2
(45) Date of Patent: Jan. 25, 2022

(54) MULTIFUNCTIONAL INTELLIGENT BREEDING AND REARING SYSTEM

(71) Applicant: Jian Jiao, Henan (CN)

(72) Inventors: Jian Jiao, Henan (CN); Zhenzhen Jiao, Henan (CN)

(73) Assignee: HENAN SHENQIAO TECHNOLOGY CO., LTD., Jiaozuo (CN)

( * ) Notice: Subject to any disclaimer, the term of this patent is extended or adjusted under 35 U.S.C. 154(b) by 359 days.

(21) Appl. No.: 16/072,191

(22) PCT Filed: Jan. 17, 2017

(86) PCT No.: PCT/CN2017/071445
§ 371 (c)(1),
(2) Date: Jul. 24, 2018

(87) PCT Pub. No.: WO2017/129004
PCT Pub. Date: Aug. 3, 2017

(65) Prior Publication Data
US 2019/0029223 A1 Jan. 31, 2019

(30) Foreign Application Priority Data
Jan. 26, 2016 (CN) .......................... 201610048832.X

(51) Int. Cl.
*A01K 5/02* (2006.01)
*A01K 1/02* (2006.01)
(Continued)

(52) U.S. Cl.
CPC .......... *A01K 5/0275* (2013.01); *A01K 1/0209* (2013.01); *A01K 1/105* (2013.01);
(Continued)

(58) Field of Classification Search
CPC ...... A01K 5/02; A01K 5/0225; A01K 5/0275; A01K 5/00; A01K 39/012; A01K 7/02; A01K 5/0114; A01K 5/0233; H04W 4/80
See application file for complete search history.

(56) References Cited

U.S. PATENT DOCUMENTS 3,204,833 A * 9/1965 Weitzner ................ G01F 11/24
222/355
3,659,754 A * 5/1972 Barone ................ A01K 5/0275
222/368

(Continued)

FOREIGN PATENT DOCUMENTS

CN 2231016 Y 7/1996
CN 2662633 Y 12/2004
(Continued)

OTHER PUBLICATIONS

Qin, Tian et al. "Design of intelligent sow precise feeding station". Contemporary Animal Husbandry No. 21. Jul. 31, 2015 (Jul. 31, 2015). pp. 36-41.

*Primary Examiner* — Kristen C Hayes
(74) *Attorney, Agent, or Firm* — Gang Yu

(57) ABSTRACT

Disclosed is a multifunctional intelligent breeding and rearing system. Functional modules such as a radio-frequency ear tag and identification device, a central controller (1), an isolation and dislodging device (2), a multifunctional feeding trough (3), an automatic feeding device (4), a quantitative water supply device, a feeding trough automatic flushing and a remaining feed detection are utilized to form a basic automatic feeding unit. Through the feeding unit, an identity and eating information of a pig is identified; for a pig that does not eat during a feeding time period, feed and water are injected into a feeding trough simultaneously according to a feed amount and a mixing ratio preset by the system, for precise feeding; a pig that has eaten up is (Continued)

dislodged in real time; and the feeding trough is automatically flushed at an end of feeding. The system realizes automatic and intelligent feeding of a livestock.

25 Claims, 7 Drawing Sheets

(51) Int. Cl.
| | | |
|---|---|---|
| *A01K 1/10* | (2006.01) | |
| *A01K 5/00* | (2006.01) | |
| *A01K 5/01* | (2006.01) | |
| *A01K 7/02* | (2006.01) | |
| *A01K 11/00* | (2006.01) | |
| *A01K 13/00* | (2006.01) | |
| *A01K 29/00* | (2006.01) | |
| *G05B 15/02* | (2006.01) | |
| *G06K 19/07* | (2006.01) | |

(52) U.S. Cl.
CPC ............... *A01K 5/001* (2013.01); *A01K 5/01* (2013.01); *A01K 5/0225* (2013.01); *A01K 5/0291* (2013.01); *A01K 7/027* (2013.01); *A01K 11/004* (2013.01); *A01K 13/003* (2013.01); *A01K 29/005* (2013.01); *G05B 15/02* (2013.01); *G06K 19/0723* (2013.01)

(56) References Cited

U.S. PATENT DOCUMENTS

| | | | |
|---|---|---|---|
| 4,461,241 | A | 7/1984 | Ostler |
| 5,778,767 | A * | 7/1998 | Rudesill .............. A47J 37/1228 |
| | | | 221/150 R |
| 10,098,331 | B2 * | 10/2018 | Bogart .................... A01K 61/80 |
| 10,357,019 | B2 * | 7/2019 | Encarnacion ........ A01K 5/0225 |
| 10,721,914 | B2 * | 7/2020 | Silverman ................ A01K 7/02 |
| 2003/0062003 | A1 * | 4/2003 | Voogd ...................... A01K 1/12 |
| | | | 119/521 |
| 2018/0125031 | A1 * | 5/2018 | Silverman ............ A01K 5/0275 |
| 2018/0368358 | A1 * | 12/2018 | Morin .................... A01K 5/001 |
| 2019/0230900 | A1 * | 8/2019 | Camara Leal De Oliveira Tognato ................... A01K 5/02 |

FOREIGN PATENT DOCUMENTS

| | | |
|---|---|---|
| CN | 1642411 A | 7/2005 |
| CN | 201238525 Y | 5/2009 |
| CN | 101507418 A | 8/2009 |
| CN | 101836619 A | 9/2010 |
| CN | 101861837 A | 10/2010 |
| CN | 202857501 U | 4/2013 |
| CN | 203482730 U | 3/2014 |
| CN | 203840921 U | 9/2014 |
| CN | 205455272 U | 8/2016 |
| EP | 1472928 A2 | 11/2004 |
| JP | H11196699 A | 7/1999 |
| KR | 20140090350 A | 7/2014 |

\* cited by examiner

MULTIFUNCTIONAL INTELLIGENT BREEDING AND REARING SYSTEM

BACKGROUND

China is a big pig-breeding country, and about 600 millions of pigs are slaughtered each year. However, the production benefit in pig breeding is not high and there is still a gap compared with the developed countries. Currently, there exist several reasons that limit the efficiency of pig-breeding which are as follows: 1, low automation degree and high manpower cost; 2, outdated feeding methods, serious feed waste, thus lead to an extreme high feed conversion ratio; and 3, the animal nature is degenerated due to sow fence-fixed feeding, which result in decreased reproductive rate and increased death rate. In view of these reasons, an intelligent group-rearing manner for returning the animal nature and improving the animal welfare is becoming a tendency and some intelligent facilities for such rearing manner are emerging unceasingly. Currently, there are two typical intelligent rearing products, namely, "a Velos intelligent sow group-rearing management system" from a Dutch Nedap Company and "a full-automatic sow feeding station TEAM system" from American Osborne Company. Meanwhile, for some similar products (such as "a sow group-rearing system" from Guangzhou Zhonghe Pig Rearing Equipment Co., Ltd.) or patent items (such as "an automatic precise feeding control method for a pregnant sow" with a publication number of CN104155920A) occurred in China in recent years, functions and technical structures are also basically similar to the above products, and feeding method and process are also consistent substantively. Technical methods for related products all are to arrange multiple feeding stations in a pigsty, in which one end of each of the feeding stations is provided with an entrance door and the other end of each of the feeding stations is provided with an exit door, and an feeding trough and an automatic feeding device are arranged in each of the feeding stations. At the each of the feeding stations, only one pig is allowed to enter at a time. When a pig wearing an ear tag enters one feeding station, a radio-frequency information reading device will send identity information of the pig to a feeding controller; the feeding controller sends a feeding instruction to the automatic feeding device after analyzing and processing the information; and the feeding device feeds a preset amount to the feeding trough. A pig that has eaten up leaves the feeding station from an exit and then a next pig can enter the feeding station to eat.

According to a field service condition and analysis on a principle of the technical structures, there are many shortcomings and defects for related products and applied patent items: 1, the cost is expensive and is frequently up to tens of thousands or even hundreds of thousands, which is discouraged to most small and medium-sized breeding enterprises and farmers. 2, it does not meet behavioral habits and eating habits of the pigs and the pigs must receive more than ten days of training at an initial service stage; as a result, a lot of staffs and labors are occupied, being contradictory to an automatic breeding purpose. 3, the pigs that have eaten up can refuse to leave and thus make other pigs cannot eat. 4, an auger based feeding manner used in current products has a relatively large error, and the related driving motor and control circuit both are complex which lead to high cost and poor reliability. 5, the feeding is only for dry feed but not wet feed; or although in some products water can be added during dry feed feeding, the water amount for adding and the dry-wet mixing proportion cannot be set freely. 6, when a pig with a poor appetite does not eat up the feed, the remaining feed will be accumulated and eaten by the following pigs and therefore cause excessive feed intake and feed waste. 7, the feeding trough cannot be cleaned automatically and the residual feed easily goes mouldy; and 8, the equipment can be only applied to feeding to-be-pregnant sows, but cannot be used for feeding growing and fattening pigs and pregnant sows. Furthermore, due to the expensive cost and the large floor area in installation, it is frequent for one piece of the current feeding equipment to undertake a task of feeding fifty to sixty pigs and the feeding time is overlong, so that many problems will be occurred.

To sum up, the technical defects and the expensive cost of the existing products hinder the development and popularization of automatic and intelligent pig breeding technologies and restrict the improvement of pig-breeding production benefit. Hence, there is an urgent need to research and develop a system product that can overcome the shortcomings and defects of the existing products, has low cost, complete functions and high automation and intelligence degrees, and is particularly applied to the small and medium-sized breeding enterprises and farmers.

SUMMARY

In light of shortcomings and defects of existing products, the present disclosure makes many innovative designs on the basis of utilizing the related art such as RFID radio-frequency ear tag and identification and a single board computer and through finding a creative way in aspects of function and principle implementation methods and an execution mechanism. Not only are the shortcomings and the defects of the related art completely overcome, but feeding and breeding processes are also more scientific and reasonable. A nature and an eating habit of an animal are met better, an intelligence degree is higher and functions are more complete.

Technical solutions of the present disclosure are as follows: functional modules such as an RFID radio-frequency ear tag and identification system, a central controller system, an isolation and dislodging device, a multifunctional feeding trough, a graduated cylinder type automatic feeding device, an automatic quantitative water supply device, an automatic flushing device and a remaining feed detection device are utilized to form a basic automatic feeding unit. One automatic feeding unit can undertake a task of automatically feeding tens of pigs. According to ear tag information identification, the automatic feeding unit dislodges pigs that have eaten up and accurately feeds pigs that have not eaten, in terms of a preset feed amount within a feeding time period. Not only can the dry feed feeding be set, but the wet feed feeding and independent water drinking also can be set. In an exemplary embodiment, a mixing proportion of feed and water as well as a water temperature also can be set freely. The automatic cleaning of the feeding trough is performed when each pig eats up or each feeding time period and feeding day are finished. If a breeding scale is relatively large or there has a higher breeding requirement, functional modules such as a weight and body temperature detection device, a feed harmful component detection device and an automatic drug feeding device are increased in each automatic feeding unit. In an exemplary embodiment, all automatic feeding units is managed intensively using a remote management host, a rearing management information system, a communication network and the like, thereby forming a breeding and rearing system with higher automation and intelligence degrees. In this system, the management host can perform data exchange with the central controller of each of the automatic feeding units and its feeding parameters can be set individually or massively. The rearing management information system may establish a rearing archive for each pig, and make statistics and analysis of feeding data and weight data of the pigs in different growth periods to generate scientific breeding data such as a feeding curve and a feed conversion ratio. With the adoption of the system, pigs that have an abnormal body temperature and do not eat can be found early, and then reasons are found and measures are taken as early as possible. Moreover, food safety supervision network and management system are established on breeding, quarantine, livestock management, slaughter and sales chains using the system, the internet and relevant databases, etc. A composition and a principle of each of functional units in the present disclosure are as follows.

An RFID radio-frequency ear tag and information reading unit: it is composed of a radio-frequency ear tag worn on an ear of a pig and a reading module embedded into a side close to a feeding trough; identity information and relevant information required by growth, feeding and the like of the pig are carried in the ear tag; when the pig gets close to the feeding trough, the reading module reads information in the ear tag and sends the information to a central controller; and the central controller analyzes and judges according to the information and sends a corresponding control instruction.

A central controller and man-machine interactive unit: it is composed of portions such as a single board computer and an embedded program, a communication module and a display touch screen, and is used to obtain RFID radio-frequency ear tag information and a detection signal of each sensor, send a control instruction to each execution mechanism according to obtained information and signal, perform data exchange with a management host and receive a control instruction of the management host, and display feeding parameters and a control process, and make a control instruction in response to a user control request.

An isolation and dislodging unit: it includes an isolation fence and a dislodging device. In order to make sure that only one pig can eat at a same time, a fence with appropriate height, width and length is provided along left, right and rear sides of the feeding trough in an enclosed manner. When the pig eats, a front or a whole of a body is in the fence. In an exemplary embodiment, an automatic door is provided at an opening used to enter of exit of the fence, thereby implementing complete isolation. A width of the fence is adjustable and is better to be wider than the body of the pig. With respect to the dislodging device, relevant machines are driven by a motor. And a pig that has eaten up is dislodged by a manner of pushing and pulling or whipping and the like, or also is dislodged using a safe pulse voltage.

A multifunctional feeding trough: it consists of a feeding trough, a water tank and a feeding pipe; a bottom of the feeding trough is provided with a drainage exit and is provided with relevant detection devices such as an electromagnetic drainage valve and a remaining feed detection device; and a plurality of water injection holes communicating with the water tank are formed along a circumference of an inner wall of an upper portion of the feeding trough. Purposes to arrange the water tank lie in: Firstly, water existed in terms of a preset amount and located in a constant temperature heating state is guaranteed all the time for later use; Secondly, when dry feed is put into the feeding trough, water in the water tank can be quickly mixed with the feed along a circumference of the inner wall of the feeding trough; and Thirdly, the feeding trough can be guaranteed to be flushed in automatic flushing. A water inlet of the water tank is connected with an automatic water supply device. A water outlet communicates with the feeding trough by an electromagnetic water discharge valve. The water tank and the feeding trough may be made into a whole and also may be provided separately. And in order to obtain an enough large potential energy, the water tank is provided at a certain height.

A graduated cylinder type automatic feeding unit: it consists of three portions, namely a storage hopper, a feeding graduated cylinder, and a drive and control circuit; the storage hopper is communicated with a feed delivery pipeline of a farm, so as to guarantee enough feed in the storage hopper all the time for later use; and the drive and control circuit receives an instruction of the central controller and feeds to the feeding trough in two times according to a set feeding amount. The first feeding can be set at 50-80% of a total amount; when the detection device detects that there is no feed in the feeding trough but the pig still wants to eat, a rest portion is fed again. When the pig does not eat up the first feeding and leaves away or is beyond a maximum eating set time, the rest portion is no longer fed. If the pig that leaves away goes back within a feeding time period, the rest portion that belongs to this pig is fed again. And if the pig does not go back, the rest portion is no longer stored and the pig is considered as that with a poor appetite to be recorded in the archive.

An automatic quantitative water supply unit: it consists of a water tank, an electromagnetic valve, and a water amount detection and constant temperature heating device; the electromagnetic valve is connected with a water supply pipeline of the farm; when there is no water in the water tank, the electromagnetic valve is opened automatically to supply the water to the water tank; when the water in the water tank reaches to a set amount, the electromagnetic valve is closed; and a water amount and a temperature in the water tank are set by the central controller. If a system instruction is wet feed feeding, when the automatic feeding device feeds the feed to the feeding trough, the water in the water tank is also injected into the feeding trough simultaneously and is mixed with the feed, and a proportion of mixing the feed and the water is determined by the feeding amount and a water injection amount of the water tank respectively set by the central controller. And when the system instruction is drinking water or flushing, only the water but not the feed is provided, wherein the heating is stopped in flushing.

An automatic flushing unit: according to an actual demand, the automatic flushing can be performed when each pig eats up and also can be performed when one feeding time period or one feeding day is finished. During flushing, the water discharge valve of the water tank and the drainage valve at a bottom of the feeding trough are opened simultaneously, and water having a certain potential energy in the water tank quickly flushes feed residues along the inner wall of the feeding trough.

A remaining feed detection device: the remaining feed detection device is installed nearby the drainage valve at the bottom of the feeding trough; and when feed in a low concave of the bottom of the feeding trough is eaten up, the detection device reports the central controller that the pig still wants to eat and the rest portion needs to be fed to it.

A weight and body temperature detection unit: a weighing platform is formed using a weighing sensor; an infrared body temperature sensor is installed at one side of the isolation fence; and when the pig eats, a weight and a body temperature are detected simultaneously and are stored to the rearing management information system. Since there is a certain difference between a detection result of the infrared sensor and an actual body temperature of the pig, corrective calculation needs to be performed by the rearing management information system according to a certain method. The weight and the body temperature of the pig may be taken as data in a rearing experiment. And through a body temperature change, a sick pig and an oestrous sow is found early.

An automatic drug feeding unit: according to a prompt of the rearing management information system and in combination with artificial diagnosis, the sick pig may be found early. Through system settings, the automatic drug feeding system will put a drug into the feeding trough together with the feed automatically when the pig eats. And the system also may set massively according to a pigsty or a pig group for preventive drug feeding.

A management host and rearing management information system: if the breeding scale is relatively large and when there are a large number of the automatic feeding units, in order to save the manpower and improve the intelligent and scientific levels of breeding, a remote management host and rearing management information system may be used. Through a communication network, a management host may perform data exchange with the central controller of each feeding unit and set feeding control parameters massively or independently. The rearing management information system may establish a rearing archive for each pig so as to manage feeding information and growth information of the each pig; and if necessary, it may set a personal feeding solution for some pigs. For a pig having an abnormal body temperature or having a poor appetite for continuous several times, the system will give a prompt. According, to data such as feeding data and weight detection of the pig during different growth periods, the rearing management information system can make various required statistical analysis and generate relevant data curves and scientific breeding parameters. And the system may perform uniform management on power supply, feed and the like of the whole farm, thereby making the whole breeding process unmanned, automatic and intelligent.

Special extended functions: since the present disclosure is an actual application based on a network, more extended applications with a special meaning may be established upon this, e.g. food safety supervision. The food safety is associated with life health of broad masses of the people. It is a problem difficult to be solved by all levels of government, mostly because of difficult supervision. Regarding the pig rearing, if a relevant prohibited goods (like clenbuterol) detection sensor is provided in each of the feeding troughs, a most important step before the pig eats will be mastered. If a management network and a relevant database are further established for management and production links such as the livestock management, the quarantine, the farm, a slaughter house and the like, information about breeding, slaughter, feeding, a flow direction and the like of the pig are clear in combination with the ear tag worn on the pig ear from beginning to end, so that a clenbuterol pig, a dead pig and the like are effectively prevented from entering a dining table of ordinary people.

Through the above design, the present disclosure has advantages compared with the existing products and technologies: 1, the price advantage is very prominent; since many innovative designs are employed to cut down the cost of the execution mechanisms, the total cost is greatly reduced; and thus the present disclosure will be several times lower than the existing products in a price after batch production; 2, the floor area is small; more feeding units are provided so as to reduce a feeding task load undertaken by each piece of equipment; and when some feeding unit has a fault, another feeding unit is switched to use; 3, designs in the feeding troughs, the isolation fences, the dislodging manner and the like are more suitable for behavioral habits and eating habits of the pigs; and during the initial use, there is no need for training; 4, the pig that has eaten up and still does not want to leave away may be dislodged in real time, so that the eating of other pigs is not affected; 5, the graduated cylinder type automatic feeding is more accurate, the feeding speed is faster and the drive device is simpler and more reliable; 6, the dry feed, the wet feed, the water drinking, the mixing proportion of the wet feed, the temperature and the like all may be set freely so as to improve the palatability of the feed; and when the pig has the poor appetite, there does not produce excessive remaining feed and cause excessive eating of the pig later; 7, the feeding troughs are cleaned automatically, so as to guarantee the eating health of the pigs and prevent cross infection of a pig disease; and 8, the present disclosure is applicable to feeding the sows and the growing and fattening pigs, and suits for not only group-rearing manner but also fence-fixed manner.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings.

Figure 1:
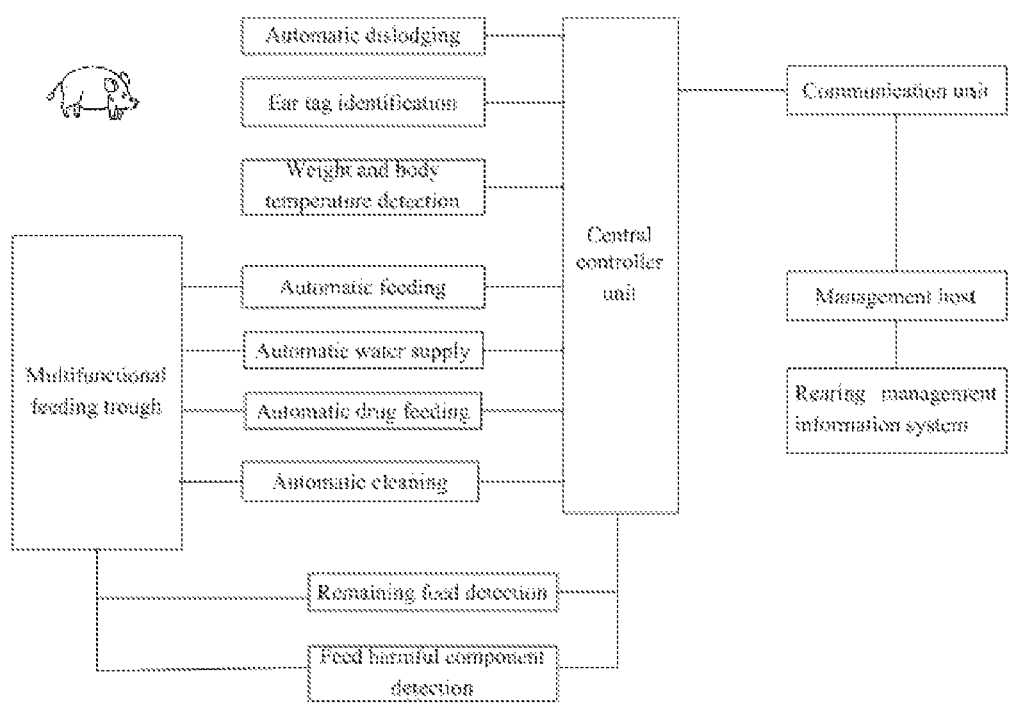
FIG. 1 shows a principle block diagram according to an embodiment of a multifunctional intelligent breeding and rearing system of the present disclosure.

In the drawings, the following labels are included:

1, central controller; 2, isolation and dislodging device; 3, multifunctional feeding trough; 4, automatic feeding device; 5, ear tag card reader; 6, automatic drug feeding device; 7, weighing platform; 2-1, isolation fence; 2-2, third lead screw; 2-3, dislodging fence plate; 2-4, third drive device; 3-1, feeding trough; 3-2, water tank; 3-3, feeding pipe; 3-4, water injection pipe; 3-5, electromagnetic valve; 3-6, water amount detection device; 3-7, water release valve of a water tank; 3-8, water release valve of a feeding trough; 3-9, drainage exit; 4-1, storage hopper; 4-2, feeding graduated cylinder; 4-3, first drive device; 5-1, storage hopper; 5-2, discharge cylinder; 5-3, feeding box; 5-4, box bottom; 5-5, isolation plate; 5-6, first drive device; 5-7, nut; 5-8, first lead screw; 6-1, drug storage bottle; 6-2, drug guide pipe; 6-3, first quantitative drug feeding push plate; 6-4, second quantitative drug feeding push plate; 6-5, second lead screw; 6-6, reset spring; 6-7, drug feeding exit; and 6-8, second drive device.

DETAILED DESCRIPTION OF THE EMBODIMENTS

It is to be noted that embodiments in the present disclosure and characteristics of the embodiments may be combined to each other if there is no conflict. The present disclosure will be described below in detail with reference to the accompanying drawings and embodiments.

FIG. 1 is a functional principle module diagram of a system. Specific principle and process have been described in detail in summary and will not be repeated here. It is to be noted that if there are a small number of feeding units, a management host and rearing management information system may not be provided. Man-machine interaction of a user may be implemented via a display touch screen of a central control unit, and also may be implemented using an intelligent mobile phone.

Figure 2:
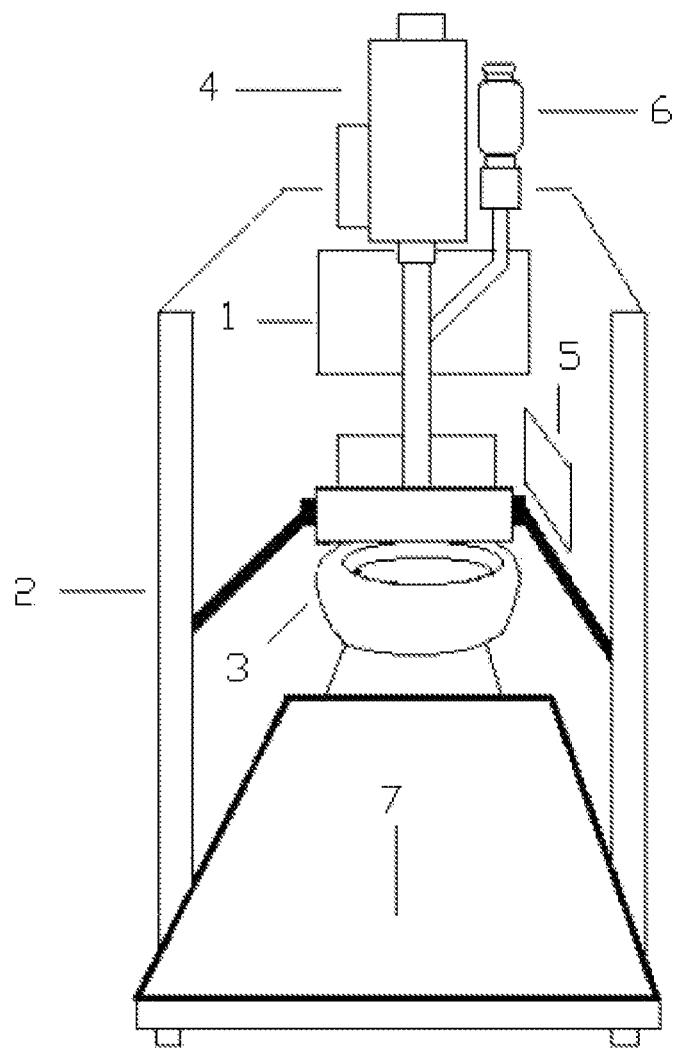
FIG. 2 shows a structural schematic diagram according to an embodiment of a multifunctional intelligent breeding and rearing system of the present disclosure.
Figure 3:
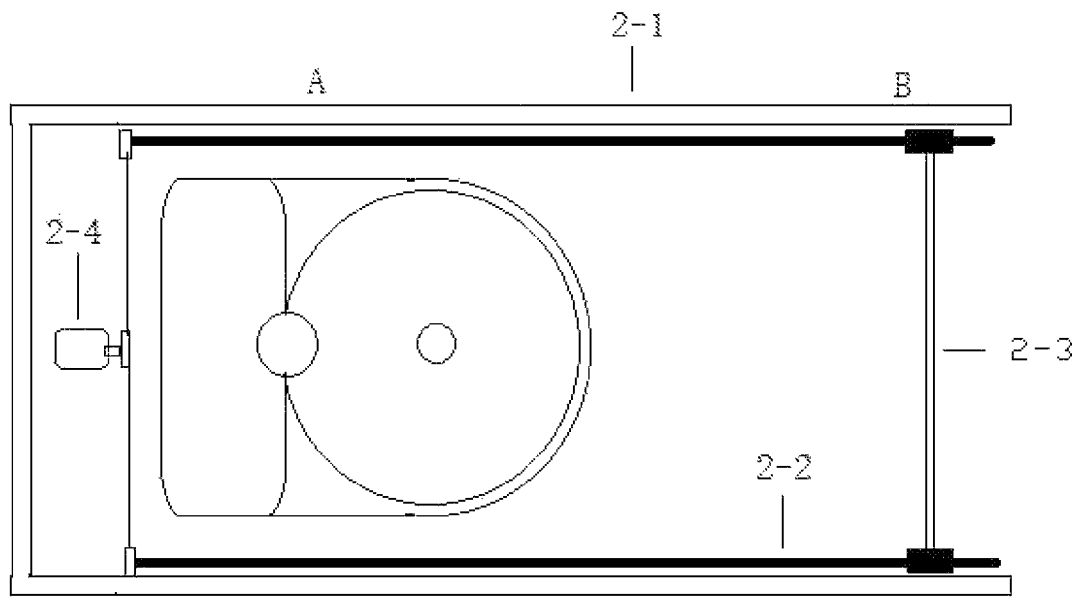
FIG. 3 shows a top view of a partial structure according to an embodiment of a multifunctional intelligent breeding and rearing system of the present disclosure.

FIG. 2 is a structural schematic diagram of a multifunctional intelligent breeding and rearing system. FIG. 3 is a top view of a multifunctional intelligent breeding and rearing system in FIG. 2 (excluding feeding and drug, feeding devices). In FIG. 3, an isolation fence 2-1 is a U-shaped fence, and is provided around rear, left and right sides of a multifunctional feeding trough in an enclosed manner. A width of the isolation fence is adjustable and is better to be greater than a body of a pig, a length can cover a front body or a whole of an eating pig, and a height is greater than the pig. A third lead screw 2-2, a dislodging fence plate 2-3, a drive motor and a transmission device (namely, a third drive device 2-4), a drive circuit and the like are jointly formed into an automatic dislodging unit. Under the driving of the motor, the dislodging fence plate is moved from an A place (when a pig eats) to a B place (when the pig is dislodged) slowly. In an exemplary embodiment, an automatic door is provided at an opening used to enter of exit of the isolation fence, thereby implementing complete isolation. The automatic door is opened upward or closed downward in a damped manner using devices such as a spring, a lever and a gear. The opening and closing of the automatic door are controlled by the dislodging fence plate, that is, when the dislodging fence plate is at the B place, the automatic door is closed downward; when the dislodging fence place leaves away from the B place, the automatic door is opened upward; when the dislodging fence plate reaches to the A place, the automatic door is closed again; and when the dislodging fence plate leaves away from the A place, the automatic door is opened again.

In an exemplary embodiment, a weight detection device is provided in the feeding unit, four wheels and a guide track are installed under a weighing platform. The dislodging fence plate shown in FIG. 3 is fixed at a front edge of the weighing platform, a width of the dislodging fence plate is equal to that of the weighing platform and a height of the dislodging fence plate is not beyond an upper edge of the feeding trough; and after the pig eats, the dislodging device pushes the pig out together with the weighing platform.

In some embodiments of the present disclosure: a whipping manner is used by the dislodging device. For example, several rubber sticks are respectively connected with the same number of spring tubes, and the other ends of the spring tubes are connected with a shaft that is rotated; and when the shaft is rotated, the swing-up and pulled rubber sticks will whip the body of a pig, thereby achieving the dislodging purpose.

In some other embodiments of the present disclosure: an electric shock manner is adopted by the automatic dislodging. That is, the body of the pig is electrically shocked using a safe pulse voltage, so that the pig leaves away with a discomfort.

Figure 5:
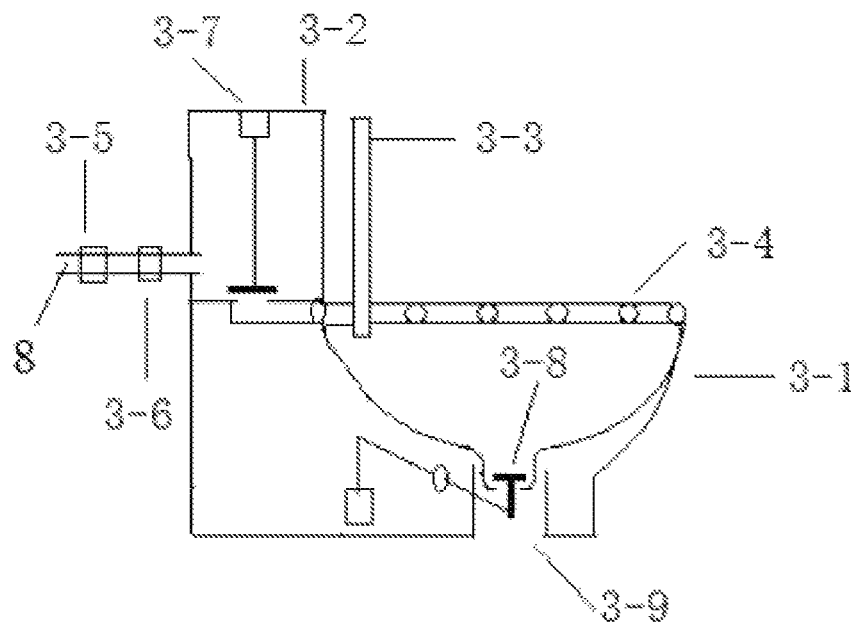
FIG. 5 shows a structural schematic diagram of a multifunctional feeding trough of a multifunctional intelligent breeding and rearing system of the present disclosure.

FIG. 5 is a side sectional view of a multifunctional feeding trough. It is assumed that a preset feeding manner of a system is feeding of dilute feed mixed at a certain proportion, the automatic feeding device puts the feed into the feeding trough 3-1 by a feeding pipe 3-3 according to a preset amount; thereafter, a water release valve of a water tank 3-7 is opened, and water heated according to a preset amount in the water tank 3-2 is injected into the feeding trough quickly and simultaneously by the water injection holes 3-4 to mix with the feed. After there is no water in the water tank, under a control of an electromagnetic valve 3-5 and a water amount detection device 3-6, the preset amount of water is re-injected into the water tank and is preheated for later use. After the feeding is finished, a water release valve of a feeding trough 3-8 at a bottom of the feeding trough and the water release valve of the water tank 3-7 are opened simultaneously, and water in the water tank flushes the feeding trough along a circumference of an inner wall of the feeding trough and is discharged by a drainage exit 3-9. After cleaning, the two water release valves are closed simultaneously. In an exemplary embodiment, if a water supply system of a farm has a relatively large water pressure and does not need to be heated, the water tank can be omitted, and a water inlet of the feeding trough is directly connected with an automatic quantitative water supply system.

A graduated cylinder type automatic feeding method is accurate in feeding, simple in a control circuit and low in demand on a drive motor, which will be described below with some embodiments.

Figure 6A:
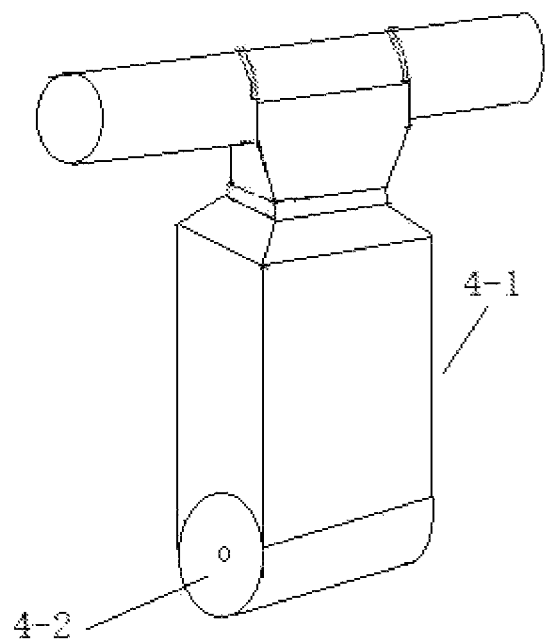
FIG. 6A shows one structural schematic diagram of a first embodiment of an automatic feeding device of a multifunctional intelligent breeding and rearing system of the present disclosure.
Figure 6B:
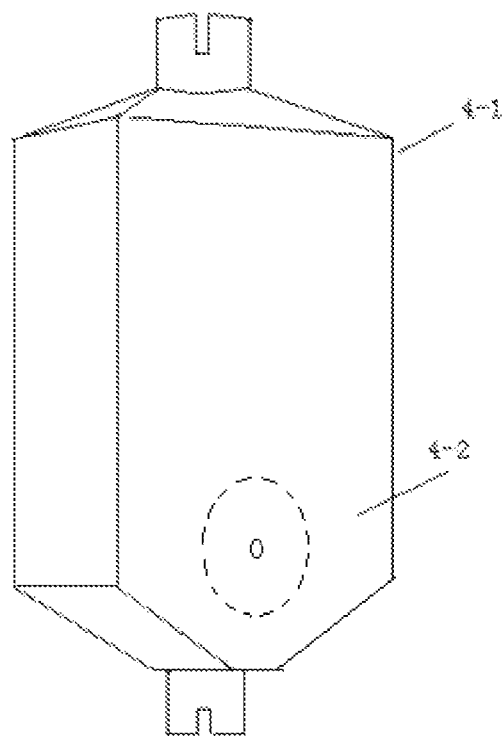
FIG. 6B shows another structural schematic diagram of a first embodiment of an automatic feeding device of a multifunctional intelligent breeding and rearing system of the present disclosure.
Figure 7:
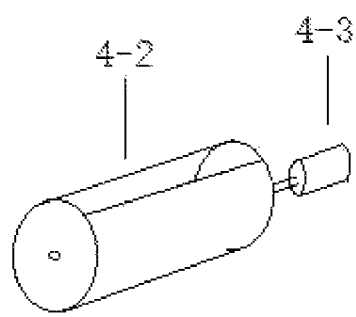
FIG. 7 shows a structural schematic diagram of a feeding graduated cylinder of a multifunctional intelligent breeding and rearing system in FIG. 6.

In an exemplary embodiment of the graduated cylinder type automatic feeding: as shown in FIG. 6A, FIG. 6B and FIG. 7, a tubular feeding graduated cylinder 4-2 is installed at an inside lower part of a storage hopper 4-1. Under the driving of the motor, the tubular graduated cylinder is rotated slowly at an appropriate rotational speed. The size of the graduated cylinder can be determined according to a weight or a volume. A material injection port with an appropriate width is provided on the graduated cylinder along an axial direction. When the graduated cylinder is rotated to open upward, the feed is injected into the graduated cylinder. When the graduated cylinder is rotated to open downward, the feed is poured out. A rotating gap between the graduated cylinder and the storage hopper as well as a structure inside the storage hopper should be appropriate, so as to guarantee that the graduated cylinder can be rotated normally, and the feed can be injected and poured out. A drive motor (namely, a first drive device 4-3) is connected with a drive shaft of the graduated cylinder by a deceleration device. The control circuit guarantees the feeding accuracy by controlling the feeding times of the graduated cylinder.

Figure 8:
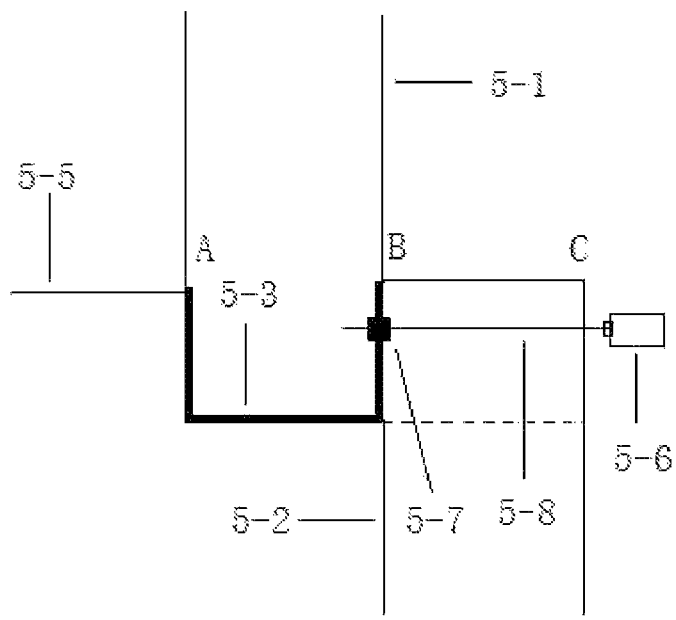
FIG. 8 shows a structural schematic diagram of a second embodiment of an automatic feeding device of a multifunctional intelligent breeding and rearing system of the present disclosure.
Figure 9:
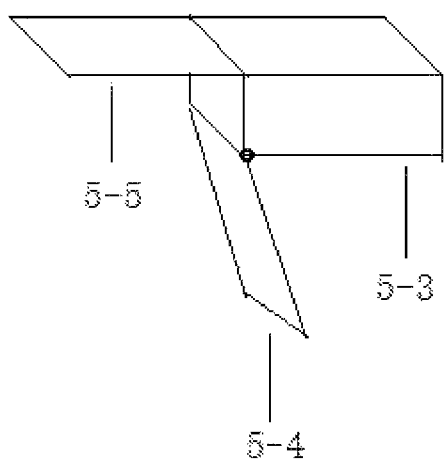
FIG. 9 shows a structural schematic diagram of a feeding box of an automatic feeding device of a multifunctional intelligent breeding and rearing system in FIG. 8.

In an exemplary embodiment of the graduated cylinder type automatic feeding in the present disclosure: as shown in FIG. 8 and FIG. 9, in which FIG. 8 is a longitudinal sectional view of a feeding device and FIG. 9 is a structural schematic diagram of a feeding box, a storage hopper 5-1, a discharge cylinder 5-2 and a feeding box 5-3 are jointly formed into an automatic feeding device as shown in FIG. 8 and FIG. 9. A bottom of the feeding box 5-3 is provided with a box bottom 5-4 capable of opening and closing freely and a fixed isolation plate 5-5 is provided at one side of an upper portion of the feeding box 5-3. The isolation plate 5-5 is as long as the box bottom 5-4. A drive motor (namely, a first drive device 5-6) pushes and pulls the feeding box by a nut 5-7 and a first lead screw 5-8 fixed on the feeding box to reciprocally translate between A and C. When the feeding box is translated to a direction A, the box bottom is closed upward and the feed in the storage hopper is injected into the feeding box. When the feeding box is translated to a direction C and to BC positions, the box, bottom is opened downward and the feed is leaked from the discharge cylinder 5-2. At the same time, the isolation plate 5-5 is translated to AB positions to isolate the downward feed. In an exemplary embodiment, the feeding box is fixed; and the feeding is implemented by opening and closing the box bottom and a box cover in sequence.

Methods for implementing two parts, namely automatic quantitative water supply and feeding trough automatic flushing, have been described in detail in the summary and in the embodiments of the multifunctional feeding trough, and will not be repeated here.

To detect the remaining feed, possible shapes of the feed should be considered, namely, dry feed in a solid state or wet feed in a liquid state is also possible to only have water. There hasn't been a method that can simultaneously detect the above three substances in the related art. In an exemplary embodiment, by employing a principle that light is refracted from one medium to another medium, a direct light source (such as a laser head of a laser pen) is installed at an appropriate position of an upper portion of the feeding trough, and a light-sensitive component is installed at a lowest position of the feeding trough (the positions also can be exchanged in installation). When there is no feed or water in the feeding trough, a light beam emitted by the light source is rightly projected on the light-sensitive component. When there has the remaining feed in the feeding trough, light rays are shielded or are deviated due to refraction. A detection circuit judges whether there has the feed according to a change of an electrical signal in the light-sensitive component. And if only the wet feed is used for feeding, only two metal contacts are installed at the lowest places of the bottom of the feeding trough.

Weight and body temperature detection has described in the summary and will not be repeated here.

Figure 10A:
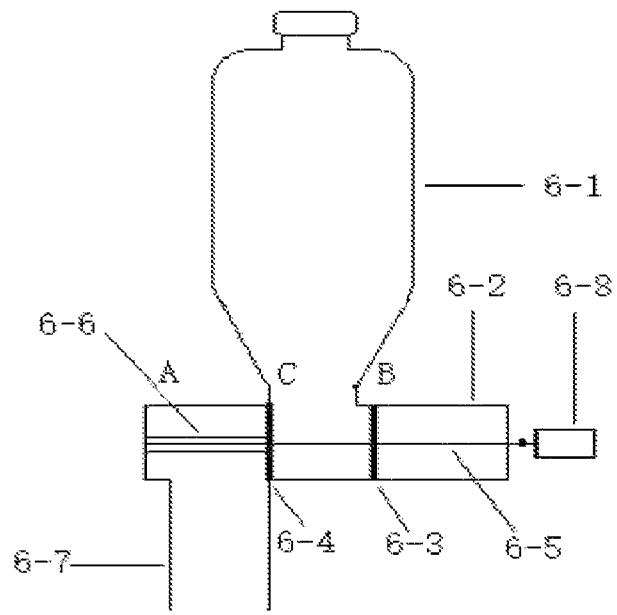
FIG. 10A shows one structural schematic diagram of an automatic feeding device of a multifunctional intelligent breeding and rearing system in present disclosure.
Figure 10B:
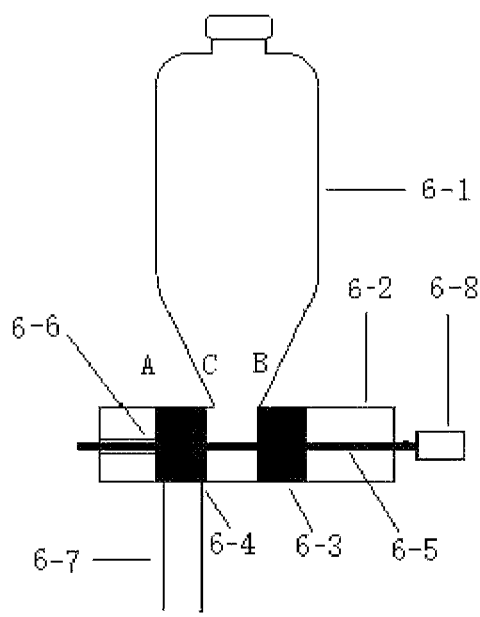
FIG. 10B shows another structural schematic diagram of an automatic feeding device of a multifunctional intelligent breeding and rearing system in present disclosure.

In an exemplary embodiment of automatic drug feeding in the present disclosure: as shown in FIG. 10A and FIG. 10B, an automatic drug feeding device consists of a drug storage bottle 6-1, a drug guide pipe 6-2, a first quantitative drug feeding push plate 6-3, a second quantitative drug feeding push plate 6-4, a second lead screw 6-5, a reset spring 6-6, a drug feeding outlet 6-7 and an electromagnet (or a motor) (namely, a second drive device 6-8); the first quantitative drug feeding push plate 6-3 and the second quantitative drug feeding push plate 6-4 are consistent to an interior profile of the drug guide pipe in a size and a shape, and can be flexibly moved in the drug, guiding pipe. When the second lead screw 6-5 is rotated, the first quantitative drug feeding push plate 6-3 can be moved left and right, and the second quantitative drug feeding push plate 6-4 only can be rotated relative to the second lead screw and cannot be moved, so that a drug feeding amount can be changed by changing a distance between the first quantitative drug feeding push plate 6-3 and the second quantitative drug feeding push plate 6-4. The drug guiding pipe CB is transparent and is marked with graduations. In a reset state, the first quantitative drug feeding push, plate 6-3 and the second quantitative drug feeding push plate 6-4 are both located at CB positions in FIG. 10A and FIG. 10B, and a space between the two plates is filled with a drug. If a control instruction requires to feed the drug, the electromagnet pushes the first quantitative drug feeding push plate 6-3 and the second quantitative drug feeding push plate 6-4 to move to AC positions; after the drug is fed from the drug feeding outlet 6-7, the reset spring 6-6 and the electromagnet are reset, and the first quantitative drug feeding push plate 6-3 and the second quantitative drug feeding push plate 6-4 are returned to the CB positions to re-inject the drug again.

A management host uses a PC and a specific configuration is determined by an actual demand. A rearing management information system has been described when a software copyright is applied and will not be discussed here.

The present disclosure provides a multifunctional breeding and rearing system. Please referring to FIG. 1 to FIG. 10, the multifunctional breeding and rearing system includes an automatic feeding device 4. The automatic feeding device 4 includes a storage hopper; a feeding container, the feeding container is movably provided below the storage hopper, and the feeding container is provided with a material receiving position for receiving feed fed by the storage hopper and a material pouring position for pouring out the feed; and a first drive device, the first drive device is connected with the feeding container in a driving manner so as to drive the feeding container to move to the material receiving position or the material pouring position.

In one embodiment of the present disclosure, as shown in FIG. 6A, FIG. 6B and FIG. 7, the feeding container is a feeding graduated cylinder 4-2. A material injection port is formed on the feeding graduated cylinder 4-2. When the feeding container is provided at the material receiving position, the material injection port is opened upward so as to receive the feed fed by the storage hopper. And when the feeding container is positioned at the material pouring position, the material injection port, is opened downward so as to pour out the feed.

In an exemplary embodiment, the feeding graduated cylinder 4-2 is of a tubular shape. The material injection port is formed on a tubular wall of the feeding graduated cylinder 4-2. A first drive device 4-3 drives the feeding graduated cylinder 4-2 to rotate around an axis of the feeding graduated cylinder 4-2, so that the material injection port is opened upward or opened downward. In an exemplary embodiment, the material injection port is a stripped port. And the stripped port is extended along an axial direction of the feeding graduated cylinder 4-2.

In an exemplary embodiment of the present disclosure, as shown in FIG. 8 and FIG. 9, the feeding container is a feeding box 5-3. A box bottom 5-4 capable of being opened and closed is provided at a bottom of the feeding box 5-3. When the feeding container is positioned at the material receiving position, the box bottom 5-4 is in a closed state so as to shelter the feed in the feeding box 5-3. And when the feeding container is positioned at the material pouring position, the box bottom 5-4 is in an open state so as to release the feed in the feeding box 5-3.

In order to guarantee that the feed in the storage hopper 5-1 is not leaked from the feeding box 5-3, an isolation plate 5-5 is provided at one side (at a same, side with a rotating shaft of the box bottom 5-4) of an upper port (the material injection port) of the feeding box 5-3. A width of the isolation plate 5-5 is equal to that of the box bottom and a length is equal to or greater than that of the box bottom 5-4, so that when the feeding box 5-3 is moved between the material receiving, position and the material pouring position (A, C), the feed in the storage hopper 5-1 is not leaked from the feeding box.

In an exemplary embodiment, the automatic feeding device includes a discharge cylinder 5-2. The discharge cylinder 5-2 is provided at one side of the storage hopper 5-1 and is positioned below a material feeding position of the feeding box 5-3. The feeding box 5-3 is movably provided between the storage hopper and the discharge cylinder 5-2 along a horizontal direction. A feeding port is provided on a top of the feeding box 5-3. When the feeding container is positioned at the material receiving position, the feeding port of the feeding box 5-3 is opposite to a discharge port of the storage hopper. And when the feeding container is positioned at the material pouring position, the box bottom 5-4 opens a bottom opening of the feeding box 5-3 and the bottom opening is provided above the discharge cylinder 5-2, so that the feed in the feeding box 5-3 is dropped into the discharge cylinder 5-2.

In order to enable the first drive device 5-6 to drive the feeding box 5-3, a nut 5-7 is provided on the feeding box 5-3. A first lead screw 5-8 matched with the nut 5-7 is provided in the nut 5-7 in a penetration manner. And the first drive device drives the first lead screw 5-8 to rotate so as to push and pull the feeding box 5-3 to move.

In an exemplary embodiment, the multifunctional intelligent breeding and rearing system includes an automatic drug feeding device 6. The automatic drug feeding device 6 includes a drug storage bottle 6-1 and a drug guide pipe 6-2. The drug guide pipe 6-2 is provided below the drug storage bottle 6-1. A drug inlet and a drug outlet are provided on a pipe wall of the drug guide pipe 6-2. The drug inlet is opposite to an outlet of the drug storage bottle 6-1. And the drug outlet of the drug guide pipe 6-2 is opened downward.

In order to guarantee that a drug is stored in the drug guide pipe 6-2, the drug inlet and the drug outlet are provided at intervals along an axial direction of the drug guide pipe 6-2. A first quantitative drug, feeding push plate 6-3 is provided in the drug guide pipe 6-2. And the first quantitative drug feeding push plate 6-3 is movably provided in the drug guide pipe 6-2 so as to push the drug entered from the drug inlet to the drug outlet.

In an exemplary embodiment, a second quantitative drug feeding push plate 6-4 is provided in the drug guide pipe 6-2. The second quantitative drug feeding push plate 6-4 movably shields the drug outlet. The first quantitative drug feeding push plate 6-3 is opposite to the second quantitative drug feeding push plate 6-4. A drug storage gap is formed between the first quantitative drug feeding push plate 6-3 and the second quantitative drug feeding push plate 6-4. The drug storage gap stores the drug when being positioned at the drug inlet and feeds the drug when being positioned at the drug outlet.

In an exemplary embodiment, the first quantitative drug feeding push plate 6-3 is movably provided relative to, the second quantitative drug feeding push plate 6-4 so as to adjust a size of the drug storage gap. By adjusting the size of the drug storage gap, a drug storage amount in the drug guide pipe 6-2 can be adjusted.

In an exemplary embodiment, in order to enable the second drive device 6-8 to push the quantitative drug feeding push plates 6-3, 6-4 to move left and right and thus implement drug feeding and drug storage, the automatic drug feeding device 6 includes a second lead screw 6-5 and a second drive device 6-8 connected with the second lead screw 6-5 in a driving manner. The second lead screw 6-5 is in threaded connection with the first quantitative drug feeding push plate 6-3. The second quantitative drug feeding push plate 6-4 is rotationally provided on the second lead screw 6-5 in a penetration manner, so when the second lead screw 6-5 is rotated, the first quantitative drug feeding push plate 6-3 can be moved left and right, and the second quantitative drug feeding push plate 6-4 only can be rotated relative to the second lead screw 6-5 and cannot be moved, thereby changing the drug storage space between the two plates.

As shown in FIG. 10A and FIG. 10B, the automatic drug feeding device 6 includes a reset spring 6-6. The reset spring 6-6 is provided at one side, far away from the first quantitative drug feeding push plate 6-3, of the second quantitative drug feeding push plate 6-4, and is abutted against the second quantitative drug feeding push plate 6-4.

In an exemplary embodiment, the multifunctional intelligent breeding and rearing system includes a multifunctional feeding trough 3. The multifunctional feeding trough 3 is provided below the automatic feeding device 4. The multifunctional feeding trough 3 includes a feeding trough 3-1, a feeding pipe 3-3 and a water tank 3-2. The feeding pipe 3-3 and the water tank 3-2 both communicate with the feeding trough 3-1 so as to put the feed and the water into the feeding trough 3-1. By communicating the feeding pipe 3-3 with the feeding trough 3-1, the feed may be put into the feeding trough 3-1. With the utilization of the water tank 3-2, the water is put into the feeding trough 3-1.

In an exemplary embodiment, the feeding trough 3-1 is provided with a water injection hole 3-4. The water tank 3-2 is provided with a water release port and a water release valve of a water tank 3-7 for controlling on-off of the water release port. The water release port is communicated with the water injection hole 3-4. In this way, the water tank can be enabled to supply the water to the feeding trough 3-1.

In an exemplary embodiment, a bottom of the feeding trough 3-1 is provided with a water discharge hole and a water discharge valve of a feeding trough 3-8 for controlling on-off of the water discharge hole. The on-off of the water discharge hole may be controlled using the water discharge valve of the feeding trough 3-8, thereby finishing water discharge of the feeding trough 3-1.

When there is inadequate water in the water tank, water is supplied to the water tank. In an exemplary embodiment, the multifunctional feeding trough includes a water injection pipe. A water amount detection device 3-6 and an electromagnetic valve 3-5 for controlling on-off of a pipeline are provided on the water injection pipe.

In an exemplary embodiment, an annular flange is provided on an inner wall of the feeding trough 3-1. The annular flange is provided along a circumference of the feeding trough 3-1. The water injection hole 3-4 is provided on the annular flange and is opened downward. A plurality of water injection holes are provided and are provided at intervals along the circumference of the feeding trough 3-1. A water injection passage for communicating each of the water injection holes 3-4 is provided in the annular flange. In this way, the inner wall of the feeding trough 3-1 is flushed using the water injection holes 3-4. By providing the annular flange on the inner wall of the feeding trough 3-1, the feed in the feeding trough 3-1 is prevented from being rooted out by each of pigs.

In order to dislodge a pig that has eaten up, as shown in FIG. 3, the multifunctional intelligent breeding and rearing system includes an isolation and dislodging device 2. The isolation and dislodging device 2 includes an isolation fence 2-1 and a dislodging component. The dislodging component is movably provided so as to dislodge a pig in the isolation fence 2-1.

Figure 4:
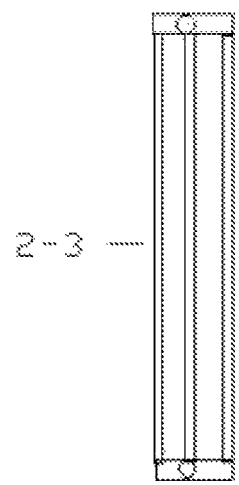
FIG. 4 shows a structural schematic diagram of a dislodging fence plate of a multifunctional intelligent breeding and rearing system in FIG. 3.

One dislodging manner of the present disclosure is as follows: as shown in FIG. 3 and FIG. 4, the dislodging component includes a dislodging fence plate 2-3. The dislodging fence plate 2-3 is movably provided in the isolation fence 2-1 so as to dislodge the pig in the isolation fence 2-1.

In an exemplary embodiment, in order to drive the dislodging fence plate 2-3, the dislodging component includes a third drive device 2-4 and a third lead screw 2-2. The third lead screw 2-2 is in threaded connection with the dislodging fence plate 2-3. The third drive device 2-4 drives the third lead screw 2-2 to rotate, thereby driving the dislodging fence plate 2-3 to move.

In an exemplary embodiment, of the present disclosure, the isolation fence 2-1 is provided with an opening used to enter of exit for enabling each of the pigs to come in and go out. An automatic door is provided at the opening used to enter of exit. The isolation fence 2-1 is provided with an eating position at which a pig eats. When the dislodging fence plate 2-3 is moved to the eating position, the automatic door is in a closed state. When the dislodging fence plate 2-3 is moved toward a direction far away from the eating position, the automatic door is in an opened state.

Another exemplary dislodging manner of the present disclosure is as follows: the dislodging component includes a rotating shaft, a rubber stick and a spring tube; one end of the spring tube is connected with the rotating shaft, and the other end of the spring tube is connected with the rubber stick, so that the rotating shaft drives the rubber stick to rotate, thereby whipping and dislodging the pig.

According to an actual condition, in an exemplary embodiment, an electric shock manner also is used to dislodge the pigs.

The present disclosure provides a multifunctional intelligent breeding and rearing system. The multifunctional intelligent breeding and rearing system includes an isolation and dislodging device 2, an automatic feeding device 4, an automatic drug feeding device 6 and a multifunctional feeding trough 3. The isolation and dislodging device 2 includes an isolation fence 2-1. The automatic feeding device 4, the automatic drug feeding device 6 and the multifunctional feeding trough 3 all are provided in the isolation fence 2-1. The automatic feeding device 4 and the automatic drug feeding device 6 both are provided above the multifunctional feeding trough 3.

In an exemplary embodiment, the multifunctional intelligent breeding and rearing system includes an ear tag card reader 5. The ear tag card reader 5 is provided in the isolation fence 2-1, and is used for detecting an ear tag of a pig entered the isolation fence 2-1 so as to determine whether the pig eats or not within a feeding time period.

In an exemplary embodiment, the multifunctional intelligent breeding and rearing system includes a central controller 1. The ear tag card reader 5 reads a radio-frequency ear tag worn on a pig ear. Identity information of each of pigs and relevant information required by growth, feeding and the like are carried in the ear tag. When the pig gets close to the feeding trough, the ear tag card reader 5 reads the information in the ear tag and sends the information to the central controller 1. And the central controller makes analysis and judgement according to the information and sends out a corresponding control instruction.

In an exemplary embodiment, the multifunctional intelligent breeding and rearing system includes a weighing platform 7; and the weighing platform 7 is provided in the isolation fence 2-1, so as to weigh a weight of a pig entered the isolation fence 2-1. In an exemplary embodiment, four wheels and a guide track are installed under the weighing platform 7. The dislodging fence as shown in FIG. 3 and FIG. 4 is fixed at a front edge of the weighing platform, a width of the dislodging fence is equal to that of the platform and a height of the dislodging fence is not greater than an upper edge of the feeding trough. After a pig eats the feed, the dislodging device pushes out the weighing platform together with the pig.

The above are some embodiments of the present disclosure and are not intended to limit the present disclosure. Various modification and variations may be made to the present disclosure by a person skilled in the art. Any modification, equivalent replacement, improvement and the like made within the spirit and principle of the present disclosure shall be included in a scope of protection of the present disclosure.

What is claimed is:

1. A multifunctional intelligent breeding and rearing system, comprising an automatic feeding device, wherein the automatic feeding device comprises:
   a storage hopper;
   a feeding container, the feeding container is movably provided within the storage hopper, and the feeding container is provided with a material receiving position for receiving feed fed by the storage hopper and a material pouring position for pouring out the feed; and
   a first drive device, the first drive device is connected with the feeding container in a driving manner so as to drive the feeding container to move to the material receiving position or the material pouring position;
   wherein the multifunctional intelligent breeding and rearing system further comprises an automatic drug feeding device, wherein the automatic drug feeding device comprises a drug storage bottle and a drug guide pipe; the drug guide pipe is provided below the drug storage bottle; a drug inlet and a drug outlet are provided on a pipe wall of the drug guide pipe; the drug inlet is opposite to an outlet of the drug storage bottle; and the drug outlet of the drug guide pipe is opened downward.

2. The multifunctional intelligent breeding and rearing system as claimed in claim 1, wherein the feeding container is a cylinder; a material injection port is provided on the cylinder; when the feeding container is positioned at the material receiving position, the material injection port is opened upward so as to receive the feed fed by the storage hopper; and when the feeding container is positioned at the material pouring position, the material injection port is opened downward so as to pour out the feed.

3. The multifunctional intelligent breeding and rearing system as claimed in claim 2, wherein the cylinder is of a tubular shape; the material injection port is provided on a tubular wall of the cylinder; and the first drive device drives the cylinder to rotate around an axis of the cylinder, so that the material injection port is opened upward or opened downward.

4. The multifunctional intelligent breeding and rearing system as claimed in claim 1, wherein the feeding container is a feeding box; a bottom of the feeding box is provided with a box bottom capable of being opened and closed; when the feeding container is positioned at the material receiving position, the box bottom is in a closed state so as to shield the feed in the feeding box; and when the feeding container is positioned at the material pouring position, the box bottom is in an open state so as to release the feed in the feeding box.

5. The multifunctional intelligent breeding and rearing system as claimed in claim 4, wherein an isolation plate is provided at one side of the material injection port of the feeding box; and a width of the isolation plate is equal to that of the box bottom and a length is equal to or greater than that of the box bottom, so that when the feeding box is moved between the material receiving position and the material pouring position, the feed in the storage hopper is not leaked from the feeding box.

6. The multifunctional intelligent breeding and rearing system as claimed in claim 4, wherein the automatic feeding device comprises a discharge cylinder; the discharge cylinder is provided at one side of the storage hopper and is positioned below a material feeding position of the feeding box; the feeding box is movably provided between the storage hopper and the discharge cylinder along a horizontal direction; a top of the feeding box is provided with a feeding port; when the feeding container is positioned at the material receiving position, the feeding port of the feeding box is opposite to a discharge port of the storage hopper; and when the feeding container is positioned at the material pouring position, the box bottom opens a bottom opening of the feeding box and the bottom opening is provided above the discharge cylinder, so that the feed in the feeding box is dropped into the discharge cylinder.

7. The multifunctional intelligent breeding and rearing system as claimed in claim 6, wherein a nut is provided on the feeding box; a first lead screw matched with the nut is provided in the nut in a penetration manner; and the first drive device drives the first lead screw to rotate so as to push and pull the feeding box to move.

8. The multifunctional intelligent breeding and rearing system as claimed in claim 1, wherein the drug inlet and the drug outlet are provided at intervals along an axial direction of the drug guide pipe; a first quantitative drug feeding push plate is provided in the drug guide pipe; and the first quantitative drug feeding push plate is movably provided in the drug guide pipe so as to push a drug entered from the drug inlet to the drug outlet.

9. The multifunctional intelligent breeding and rearing system as claimed in claim 8, wherein a second quantitative drug feeding push plate is provided in the drug guide pipe; the second quantitative drug feeding push plate movably shields the drug outlet; the first quantitative drug feeding push plate and the second quantitative drug feeding push plate are provided oppositely; a drug storage gap is formed between the first quantitative drug feeding push plate and the second quantitative drug feeding push plate; and the drug storage gap stores the drug when being positioned at the drug inlet and feeds the drug when being positioned at the drug outlet.

10. The multifunctional intelligent breeding and rearing system as claimed in claim 9, wherein the first quantitative drug feeding push plate is movably provided relative to the second quantitative drug feeding push plate so as to adjust a size of the drug storage gap.

11. The multifunctional intelligent breeding and rearing system as claimed in claim 10, wherein the automatic drug feeding device further comprises a second lead screw and a second drive device connected with the second lead screw in a driving manner; the second lead screw is in threaded connection with the first quantitative drug feeding push plate; the second quantitative drug feeding push plate is rotationally provided on the second lead screw in a penetration manner, so when the second lead screw is rotated, the first quantitative drug feeding push plate is moved left and right, and the second quantitative drug feeding push plate only can be rotated relative to the second lead screw and cannot be moved, thereby changing the drug storage space between the first quantitative drug feeding push plate and the second quantitative drug feeding push plate.

12. The multifunctional intelligent breeding and rearing system as claimed in claim 9, wherein the automatic drug feeding device further comprises a reset spring; the reset spring is provided at one side, far away from the first quantitative drug feeding push plate, of the second quantitative drug feeding push plate, and is abutted against the second quantitative drug feeding push plate.

13. The multifunctional intelligent breeding and rearing system as claimed in claim 1, further comprising:
   a multifunctional feeding trough; the multifunctional feeding trough is provided below the automatic feeding device; the multifunctional feeding trough comprises a feeding trough, a feeding pipe and a water tank; and the feeding pipe and the water tank both communicate with the feeding trough so as to put a feed and a water into the feeding trough.

14. The multifunctional intelligent breeding and rearing system as claimed in claim 13, wherein the feeding trough is provided with a water injection hole; the water tank is provided with a water release port and a water release valve of the water tank for controlling on-off of the water release port; and the water release port is communicated with the water injection hole.

15. The multifunctional intelligent breeding and rearing system as claimed in claim 13, wherein a bottom of the feeding trough is provided with a water discharge hole and a water release valve of a feeding trough for controlling on-off of the water discharge hole.

16. The multifunctional intelligent breeding and rearing system as claimed in claim 15, wherein an annular flange is provided on an inner wall of the feeding trough; the annular flange is provided along a circumference of the feeding trough; the water injection hole is provided on the annular flange and is opened downward; a plurality of water injection holes are provided and are provided at intervals along the circumference of the feeding trough; and a water injection passage for communicating each of the water injection holes is provided in the annular flange.

17. The multifunctional intelligent breeding and rearing system as claimed in claim 13, wherein the multifunctional feeding trough further comprises a water injection pipe; a water amount detection device and an electromagnetic valve for controlling on-off of a pipeline are provided on the water injection pipe.

18. The multifunctional intelligent breeding and rearing system as claimed in claim 1, further comprising:

an isolation and dislodging device, wherein the isolation and dislodging device comprises an isolation fence and a dislodging component; and the dislodging component is movably provided so as to dislodge a pig in the isolation fence.

19. The multifunctional intelligent breeding and rearing system as claimed in claim 18, wherein the dislodging component comprises a dislodging fence plate; the dislodging fence plate is movably provided in the isolation fence so as to dislodge the pig in the isolation fence.

20. The multifunctional intelligent breeding and rearing system as claimed in claim 19, wherein the dislodging component further comprises a third drive device and a third lead screw; the third lead screw is in threaded connection with the dislodging fence plate; and the third drive device drives the third lead screw to rotate, thereby driving the dislodging fence plate to move.

21. The multifunctional intelligent breeding and rearing system as claimed in claim 19, wherein the isolation fence is provided with an opening used to enter of exit for enabling a pig to come in and go out; an automatic door is provided at the opening used to enter of exit; the isolation fence is provided with an eating position at which a pig eats; when the dislodging fence plate is moved to the eating position, the automatic door is in a closed state; and when the dislodging fence plate is moved toward a direction far away from the eating position, the automatic door is in an opened state.

22. A multifunctional intelligent breeding and rearing system, comprising an automatic feeding device, wherein the automatic feeding device comprises:
  a storage hopper;
  a feeding container, the feeding container is movably provided below the storage hopper, and the feeding container is provided with a material receiving position for receiving feed fed by the storage hopper and a material pouring position for pouring out the feed; and
  a first drive device, the first drive device is connected with the feeding container in a driving manner so as to drive the feeding container to move to the material receiving position or the material pouring position;
  wherein the feeding container is a feeding box; a bottom of the feeding box is provided with a box bottom capable of being opened and closed; when the feeding container is positioned at the material receiving position, the box bottom is in a closed state so as to shield the feed in the feeding box; and when the feeding container is positioned at the material pouring position, the box bottom is in an open state so as to release the feed in the feeding box.

23. The multifunctional intelligent breeding and rearing system as claimed in claim 22, wherein an isolation plate is provided at one side of the material injection port of the feeding box; and a width of the isolation plate is equal to that of the box bottom and a length is equal to or greater than that of the box bottom, so that when the feeding box is moved between the material receiving position and the material pouring position, the feed in the storage hopper is not leaked from the feeding box.

24. The multifunctional intelligent breeding and rearing system as claimed in claim 22, wherein the automatic feeding device comprises a discharge cylinder; the discharge cylinder is provided at one side of the storage hopper and is positioned below a material feeding position of the feeding box; the feeding box is movably provided between the storage hopper and the discharge cylinder along a horizontal direction; a top of the feeding box is provided with a feeding port; when the feeding container is positioned at the material receiving position, the feeding port of the feeding box is opposite to a discharge port of the storage hopper; and when the feeding container is positioned at the material pouring position, the box bottom opens a bottom opening of the feeding box and the bottom opening is provided above the discharge cylinder, so that the feed in the feeding box is dropped into the discharge cylinder.

25. The multifunctional intelligent breeding and rearing system as claimed in claim 24, wherein a nut is provided on the feeding box; a first lead screw matched with the nut is provided in the nut in a penetration manner; and the first drive device drives the first lead screw to rotate so as to push and pull the feeding box to move.

\* \* \* \* \*